(12) United States Patent
Hills et al.

(10) Patent No.: US 7,106,962 B2
(45) Date of Patent: Sep. 12, 2006

(54) SYNCHRONIZING SHUTTER AND FLASH IN CAMERA WITH SWITCH CLOSING MEMBER CAPABLE OF ELASTIC DEFORMATION

(75) Inventors: Robert G. Hills, York, PA (US); Michael L. Wirt, Avon, NY (US); Wayne E. Stiehler, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 7 days.

(21) Appl. No.: 10/972,806

(22) Filed: Oct. 25, 2004

(65) Prior Publication Data

US 2006/0088306 A1  Apr. 27, 2006

(51) Int. Cl.
 *G03B 9/70* (2006.01)
(52) U.S. Cl. .................................... 396/195
(58) Field of Classification Search ............. 396/195, 396/180, 189, 190
 See application file for complete search history.

(56) References Cited

U.S. PATENT DOCUMENTS

| 2,641,978 | A | | 6/1953 | Lawson |
| 3,318,217 | A | | 5/1967 | Ernise |
| 3,747,491 | A | * | 7/1973 | Becker et al. ............... 396/185 |
| 5,235,366 | A | | 8/1993 | Kucmerowski |
| 5,315,332 | A | | 5/1994 | Hirasaki et al. |
| 5,365,298 | A | | 11/1994 | Fox |
| 5,432,572 | A | | 7/1995 | Hirasaki et al. |
| 5,550,607 | A | | 8/1996 | Mizoguchi |
| 5,913,084 | A | | 6/1999 | Allen et al. |
| 6,001,465 | A | | 12/1999 | Takahashi et al. |
| 6,337,953 | B1 | * | 1/2002 | Nakanishi et al. .......... 396/176 |
| 6,418,278 | B1 | | 7/2002 | Bittner |

FOREIGN PATENT DOCUMENTS

| JP | 4-119438 | 4/1991 |
| JP | 10-161201 | 11/1996 |
| JP | 11-125859 | 10/1997 |

* cited by examiner

*Primary Examiner*—W. B. Perkey
*Assistant Examiner*—Chia-how Michael Liu
(74) *Attorney, Agent, or Firm*—Robert Luke Walker (57) ABSTRACT

A camera with a built-in electronic flash has a spring-driven high energy lever that is pivoted for initiating shutter opening and for translating a switch closing member to close a normally open shutter-flash synchronization switch. When the switch reopens, it translates the switch closing member in reverse. Then, during film winding a metering cam is rotated to pivot the high energy lever in reverse. The switch closing member is adapted to be pivoted temporarily of the way of the high energy lever to allow the high energy lever to be returned past the switch closing member to an original or home position.

19 Claims, 13 Drawing Sheets

SYNCHRONIZING SHUTTER AND FLASH IN CAMERA WITH SWITCH CLOSING MEMBER CAPABLE OF ELASTIC DEFORMATION

FIELD OF THE INVENTION

The invention relates generally to cameras and more particularly to synchronizing a shutter and a flash in a camera during picture-taking.

Although embodied preferably in an analog camera, the invention could also be used in a digital camera.

BACKGROUND OF THE INVENTION

General Description of Camera

Film and cameras that are all in one, commonly referred to as disposable single-use or one-time-use cameras, have become well known. The one-time-use camera is a simple point-and-shoot type camera comprising a conventional film cartridge loaded into a cartridge receiving chamber in a main body part, an unexposed film roll pre-wound from the film cartridge onto a film supply spool in a film supply chamber in the main body part, a film-exposing back-frame opening between the cartridge receiving and film supply chambers, a fixed-focus taking lens, a manually rotatable film winding thumbwheel coaxially engaged with a film winding spool inside the film cartridge for winding the filmstrip after each exposure, a metering lever for locking the thumbwheel, a single-blade shutter, a high energy lever for actuating the shutter blade to make an exposure and for moving the metering lever to unlock the thumbwheel, a manually depressible shutter release button for unlatching the high energy lever, a frame counter wheel that has a numerical scale of frame count indicia and is incrementally rotated to successively view the frame count indicia, a metering sprocket for incrementally rotating the frame counter wheel during film winding, a metering cam coaxially connected to the metering sprocket for controlling movement of the high energy lever and metering lever during film winding, an anti-backup pawl that engages the frame counter wheel to prevent its reverse rotation, a direct see-through viewfinder having front and rear viewfinder lenses, and in some models an electronic flash. A pair of separate front and rear cover parts house the main body part between them to complete the camera. The rear cover part connects to the main body part and/or to the front cover part to make the main body part light-tight. A decorative cardboard outer box or label at least partially covers the front and rear cover parts and has respective openings for the taking lens, etc.

To make an exposure on film, the shutter release button is manually depressed. This unlatches the high energy lever which is then pivoted via a high energy spring to impact against a strike tab on the shutter blade. The shutter blade in turn is pivoted open to uncover an exposure aperture. Once the high energy lever is pivoted beyond the strike tab, a return spring pivots the shutter blade closed to recover the exposure aperture.

The high energy spring continues to pivot the high energy lever as the shutter blade is being pivoted closed, in order to cause the high energy lever to pivot the metering lever out of locking engagement with the thumbwheel. The timing is such that once the shutter blade is pivoted closed the thumbwheel is freed to be manually rotated in the film winding direction. Rotation of the thumbwheel rotates the film winding spool inside the film cartridge to wind an exposed frame of the filmstrip from the back-frame opening into the film cartridge and to advance an unexposed frame of the filmstrip from the unexposed film roll to the back-frame opening. The rewinding movement of the filmstrip the equivalent of slightly more than one frame width rotates the metering sprocket in engagement with successive perforations in the filmstrip to incrementally rotate the frame counter wheel to view its next lower-numbered indicia. Also, the metering sprocket rotates the metering cam to return the high energy lever past the strike tab of the shutter blade and so that the high energy spring can hold the high energy lever re-latched or reset. Since the high energy spring is then constrained, a metering spring (which is weaker than the high energy spring) is allowed to return the metering lever to locking re-engagement with the thumbwheel. Alternatively, when there is no metering spring as in U.S. Pat. No. 5,235,366 issued Aug. 10, 1993, the high energy spring returns the metering lever to locking engagement with the thumbwheel.

When the maximum number of frames available on the filmstrip have been exposed and the filmstrip is completely wound into the film cartridge, the one-time-use camera is given to a photofinisher who breaks away a cover door portion of the rear cover part from the main body part and removes the film cartridge with the exposed filmstrip from the cartridge receiving chamber. Then, he removes the exposed filmstrip from the film cartridge to develop the latent images and make prints for the customer.

Synchronizing Shutter and Flash in Camera

When the one-time-use camera includes an electronic flash, some means must be provided for firing (igniting) the flash in synchronization with pivoting the shutter blade open and closed. Such means typically includes a normally open shutter-flash synchronization switch, which when closed completes the flash ignition circuit to fire the electronic flash, and a separate switch closing member.

One known approach is for the shutter-flash synchronization switch to consist of a pair of normally separated leaf spring switch contacts and for the shutter blade to serve as the switch closing member. When the shutter blade is pivoted open, it swings against one of the leaf spring contacts to bend that contact against the other one. This closes the switch to fire the electronic flash. When the shutter blade is pivoted closed, it separates from the bent leaf spring switch contact, allowing that contact to straighten in order to reopen the switch. See U.S. Pat. No. 6,418,278 B1 issued Jul. 9, 2002.

A second known approach is for the shutter blade to serve as a movable switch contact of the shutter-flash synchronization switch. In this instance, the shutter blade is electrically conductive and is conductively connected to the flash ignition circuit. When the shutter blade is pivoted open, it impacts against a fixed switch contact of the shutter-flash synchronization switch to close the switch. When the shutter blade is pivoted closed, it separates from the fixed switch member to reopen the switch. See U.S. Pat. No. 5,913,984 issued Jun. 15, 1999.

A third known approach is to use a high energy lever or high impact striker to drive a switch closing member. When the shutter release button is manually depressed to unlatch the high energy lever, the high energy lever is pivoted via a high energy spring against the switch closing member to rotate the switch closing member. The shutter closing member is rotated against one leaf spring contact to bend that contact against another leaf spring switch contact, in order to close the shutter-flash synchronization switch. The high energy lever is then pivoted beyond the switch closing member and against a strike tab on the shutter blade to pivot the shutter blade open. A return spring pivots the shutter blade closed. A return spring rotates the shutter closing member to separate from the bent leaf spring switch contact, allowing that contact to straighten in order to reopen the shutter-flash synchronization switch. Since the switch closing member when returned is in the way of the high energy member, the shutter closing member is provided with an inclined edge that allows the high energy member to rotate the shutter closing member temporarily out of the way of the high energy lever to permit the high energy lever to be returned past the switch closing member and be re-latched or reset. This is done without the shutter closing member re-closing the shutter-flash synchronization switch. See U.S. Pat. No. 3,318,217 issued May 9, 1967.

SUMMARY OF THE INVENTION

According to one aspect of the invention there is provided a camera comprising an exposure aperture, a shutter that is movable open and closed to uncover and re-cover the exposure aperture, an electronic flash that is fired to provide flash illumination, a normally open shutter-flash synchronization switch that is closed to synchronize shutter movement and flash firing, a high energy member that is movable for moving the shutter and for closing the shutter-flash synchronization switch and that is returned to be reset, and a switch closing member that is normally in the way of the high energy member to be moved by the high energy member to close the shutter-flash synchronization switch and that is returned to be in the way of the high energy member when the shutter-flash synchronization switch reopens, but that is adapted to permit the high energy member to temporarily urge the switch closing member out of the way of the high energy member without re-closing the shutter-flash synchronization switch in order to allow the high energy member to return past the switch closing member to be reset, is characterized in that:

the switch closing member is resilient to make the switch closing member capable of being elastically deformed to enable the switch closing member to be to be temporarily urged out of the way of the high energy member and to make the switch closing member elastically recover its original shape once the high energy member is returned past the switch closing member to enable the switch closing member to return to being in the way of the high energy member.

According to another aspect of the invention the switch closing member is supported to be translated to move to close the shutter-flash synchronization switch and to return to be in the way of the high energy member and is supported to swing when temporarily urged out of the way of the high energy member.

According to another aspect of the invention the shutter-flash synchronization switch is spring-biased open to return the switch closing member to be in the way of the high energy member when the shutter-flash synchronization switch reopens.

DETAILED DESCRIPTION OF THE INVENTION

The invention is disclosed as preferably being embodied in a one-time-use flash camera. Since the elements of a one-time-use flash camera are generally known, the description, which follows is directed mostly to those elements forming part of or cooperating with the invention. It is understood that those elements not disclosed may take various forms known to persons of ordinary skill in the camera arts.

Figure 1:
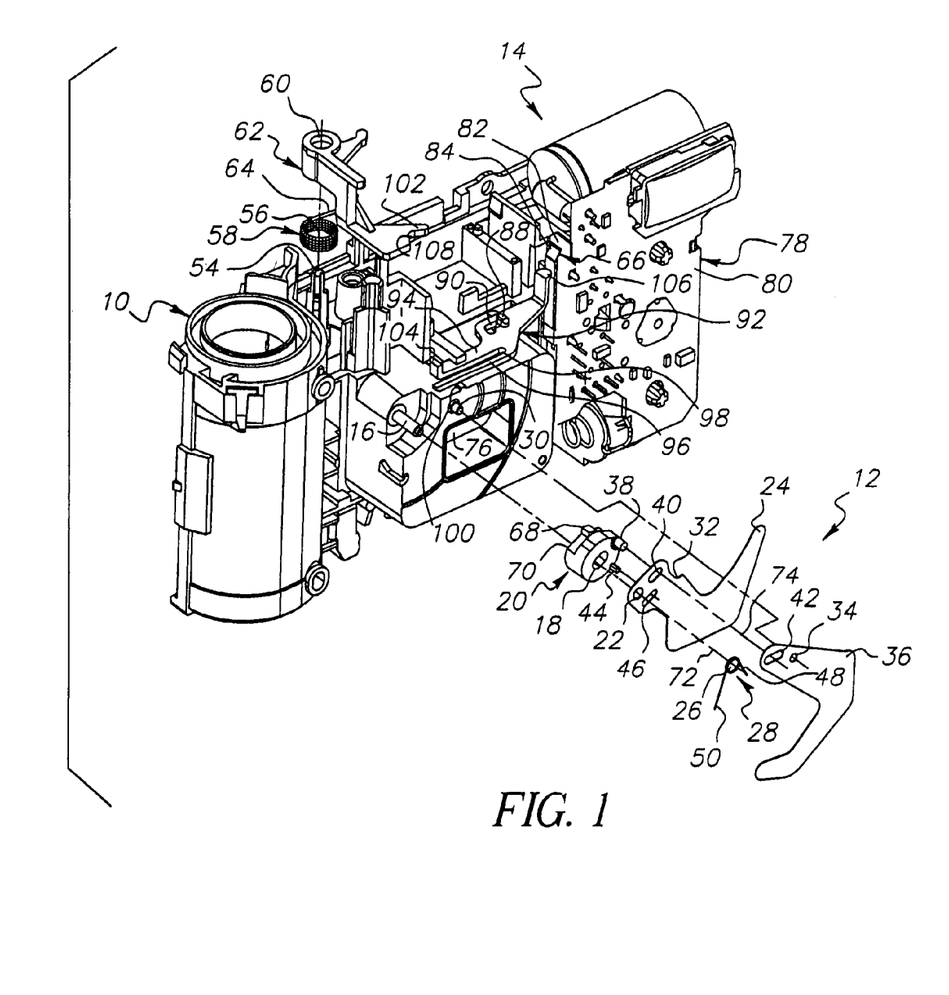
FIG. 1 is an exploded front perspective of a partially illustrated one-time-use camera including a shutter-flash synchronization assemblage having a dual-blade shutter according to a preferred embodiment of the invention.
Figure 2:
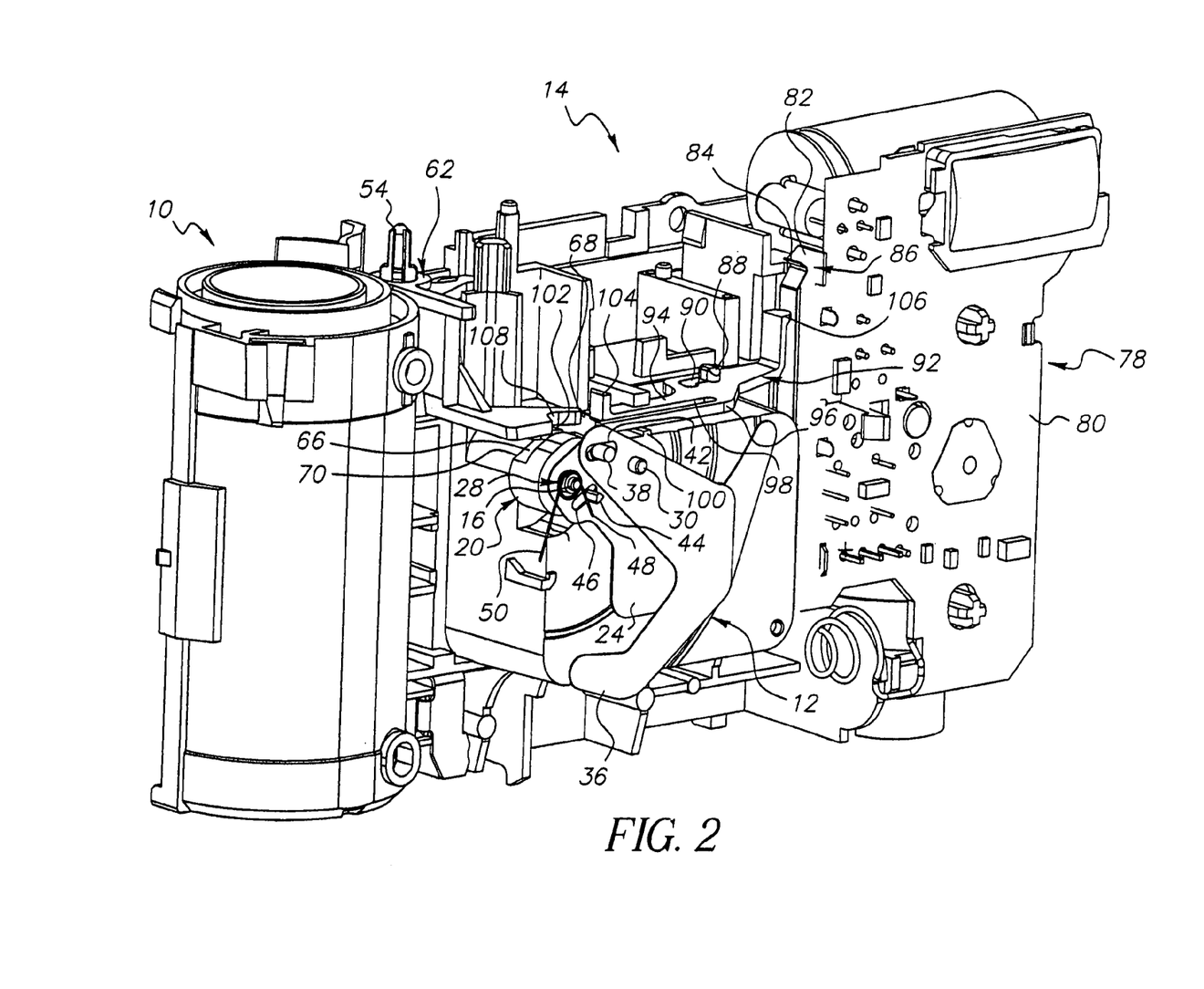
FIG. 2 is an assembled front perspective view of the partially illustrated camera showing the shutter-flash synchronization assemblage with the dual-blade shutter closed.
Figure 3:
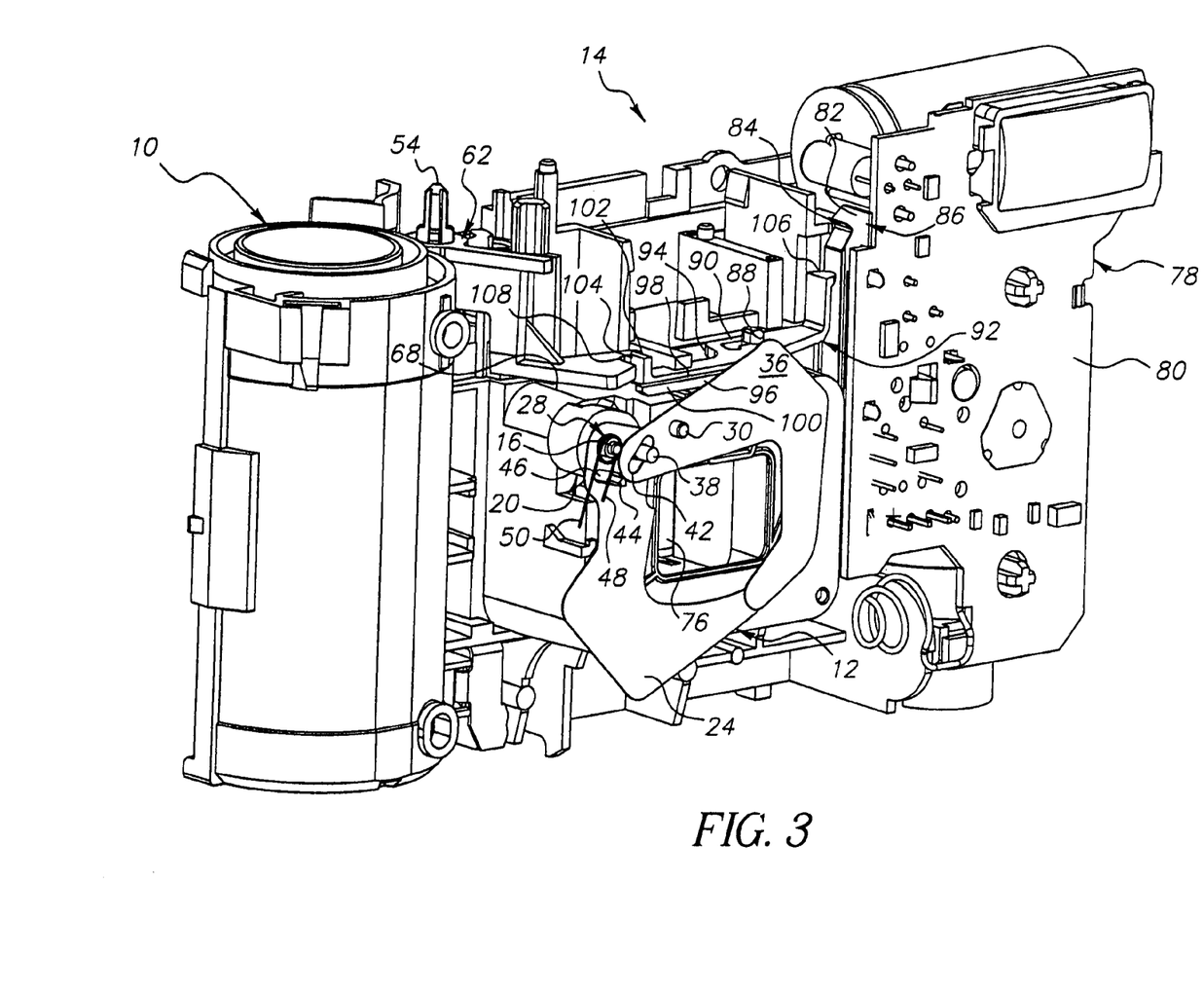
FIG. 3 is a front perspective view of the partially illustrated camera showing the shutter-flash synchronization assemblage with the dual-blade shutter open.

Referring now to the drawings, and in particular to FIGS. 1–3, there is shown a main body part 10 and a dual-blade center-opening shutter 12 of a partially depicted one-time-use camera 14.

As shown in FIG. 1, a fixed round pivot-support/translation-support post 16 on the main body part 10 projects frontward through an elongate slot 18 in a rotatable and translatable shutter opening and closing driver 20, then through a round pivot hole 22 in a first shutter blade 24 of the dual-blade shutter 12, and then into a center-coil opening 26 in a hairpin-shaped driver return spring 28. The shutter driver 20, the first shutter blade 24, and the driver return spring 28 are assembled on the fixed post 16.

Figure 4:
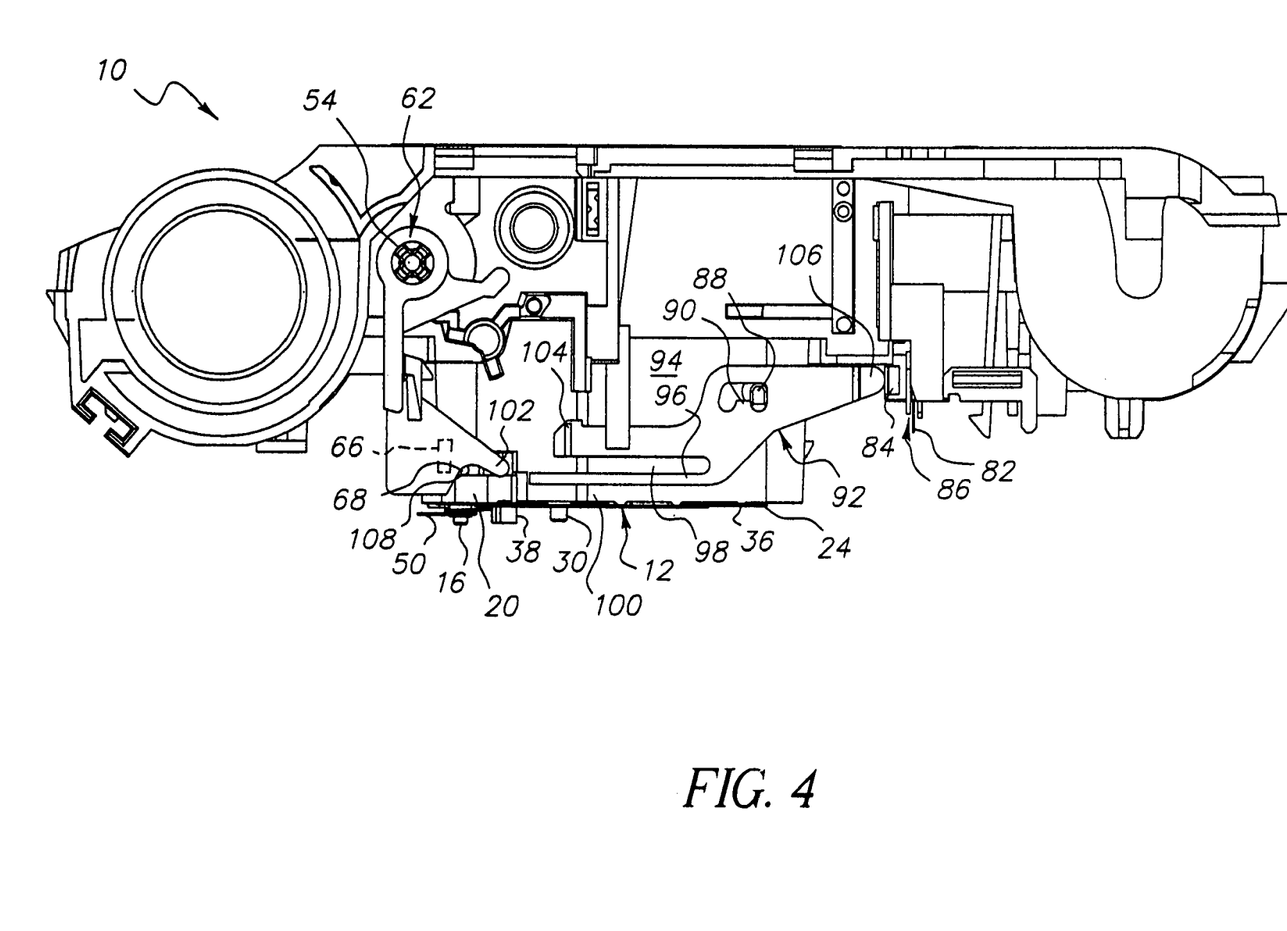
FIGS. 4, 5, 6, 7, 8, 9, 10, 11, 12, and 13 are paired top plan and front elevation views of the partially illustrated camera showing sequential steps in the operation of the shutter-flash synchronization assemblage.
Figure 5:
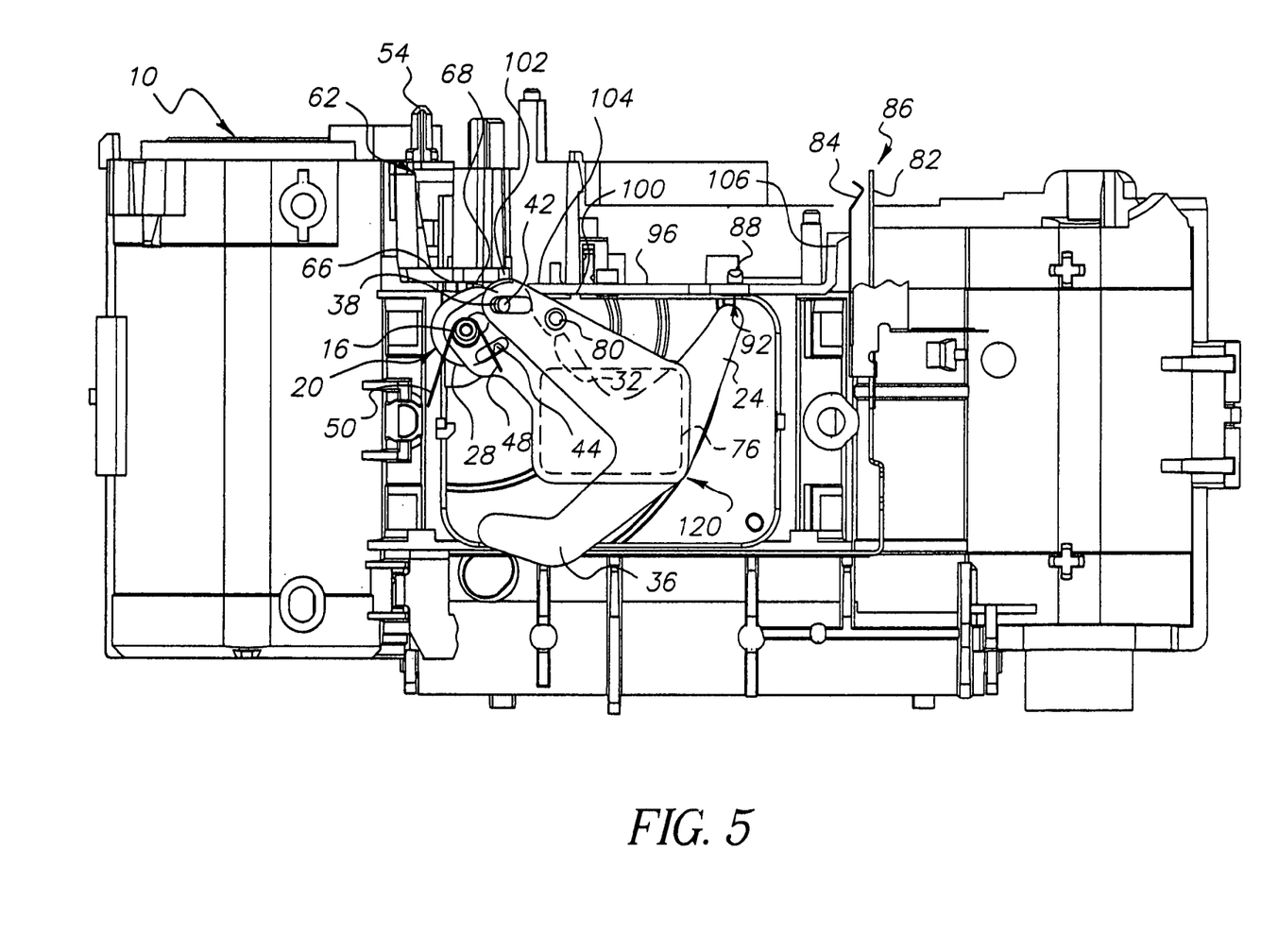

As shown in FIGS. 1, 4 and 5, a fixed round stop and pivot-support post 30 on the main body part 10 projects frontward opposite an edge notch 32 in the first shutter blade 24 of the dual-blade shutter 12 and then into a round pivot hole 34 in a second shutter blade 36 of the dual-blade shutter. The second shutter blade 36 is assembled on the fixed post 30.

As shown in FIG. 1, a shutter drive post 38 on the shutter driver 20 projects frontward through an elongate slot 40 in the first shutter blade 24 and then into a similar size slot 42 in the second shutter blade 36. The two elongate slots 40 and 42 partially overlap. See FIG. 2.

As shown in FIGS. 1 and 2, an energizing post 44 on the shutter driver 20 projects frontward through a clearance slot 46 in the first shutter blade 24 and then into restraining contact with a resilient leg 48 of the hairpin-shaped driver return spring 28. Another leg 50 of the driver return spring 28 is held fast by a fixed lug (not shown). This enables the driver return spring 28 to urge the shutter driver 20 to rotate counterclockwise in FIG. 1 about the fixed post 16 on the main body part 10.

A fixed round post 54 on the main body part 10 projects upward in FIG. 1 through a center-coil opening 56 in a high energy spring 58 and then into a round pivot hole 60 in a high energy lever 62. The high energy spring 58 and the high energy lever 62 are assembled on the fixed post 54. A resilient leg 64 of the high energy spring 58 urges the high energy lever 62 to pivot or swing counterclockwise in FIG. 1 about the fixed post 54. As is known in the prior art, the high energy lever is normally latched in place in an initial or home position shown in FIGS. 2, 4 and 5.

Shutter Operation

To make an exposure on film, a shutter release button (not shown) is manually depressed to unlatch the high energy lever 62 in its initial or home position shown in FIGS. 2, 4 and 5. The high energy lever 62 is then pivoted or swung counterclockwise in FIGS. 3, 6 and 7 about the fixed post 54 on the main body part 10, via the resilient leg 64 of the high energy spring 58. A striker projection 66 on the underside of the high energy lever 62 impacts against (strikes) a strike tab 68 on a curved edge portion 70 of the shutter driver 20 to quickly rotate the shutter driver clockwise in FIGS. 3, 6 and 7 about the fixed post 16 on the main body part 10. As a result, the energizing post 44 on the shutter driver 20 bends the resilient leg 48 of the driver return spring 28 towards the resilient leg 50 of the driver return spring. Also, the shutter drive post 38 on the shutter driver 20 that projects through the elongate slot 40 in the first shutter blade 24 and into the similar size slot 42 in the second shutter blade 36 pivots the first shutter blade clockwise in FIGS. 3 and 7 about the fixed post 16 on the main body part 10 and pivots the second shutter blade counter clockwise in the same FIGS. about the fixed post 30 on the main body part. This opening movement of the first and second shutter blades 24 and 36 occurs about respective parallel axes 72 and 74 depicted in FIG. 1, and it causes the two blades to swing away from one another to uncover an exposure aperture 76 in the main body part 12 in order to begin exposure on film. When the first shutter blade 24 is pivoted clockwise to open, its edge notch 32 separates from contact with the fixed post 30 on the main body part 10. See FIG. 1.

Figure 6:
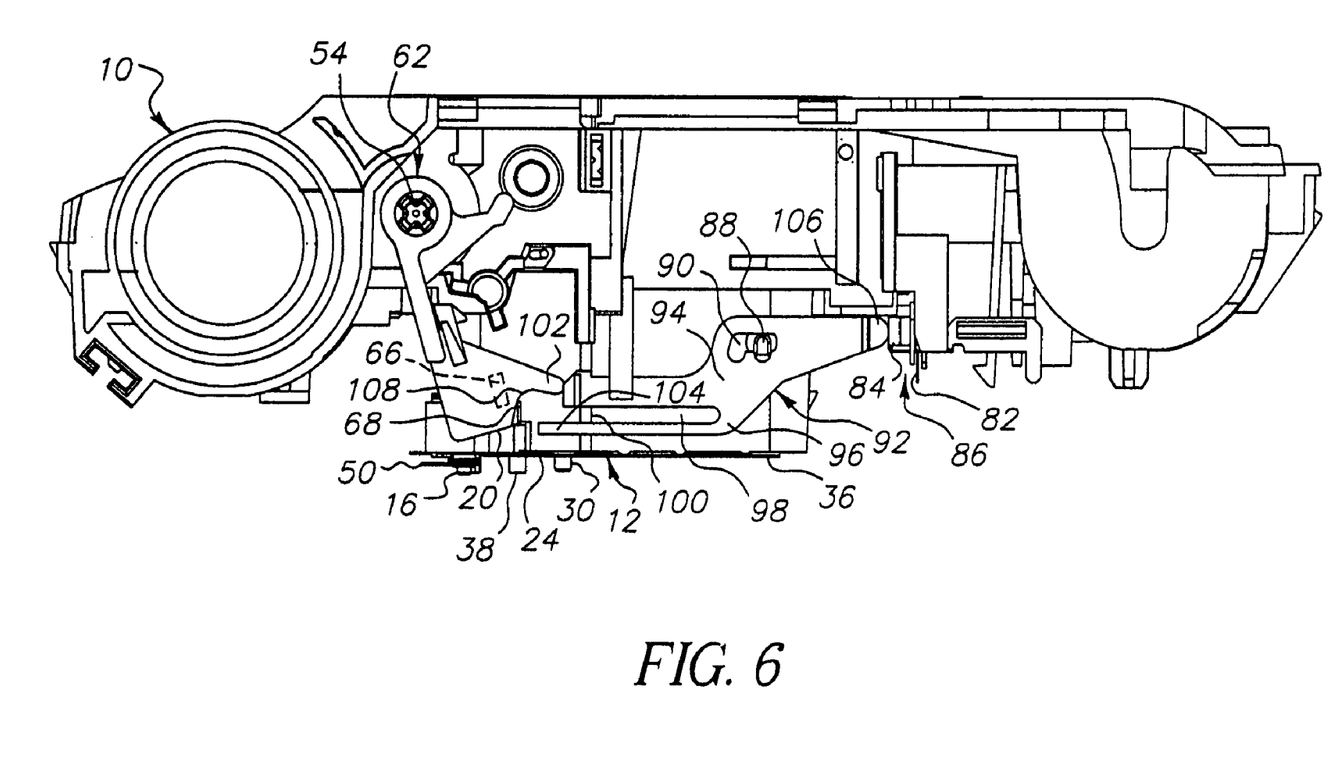
Figure 7:
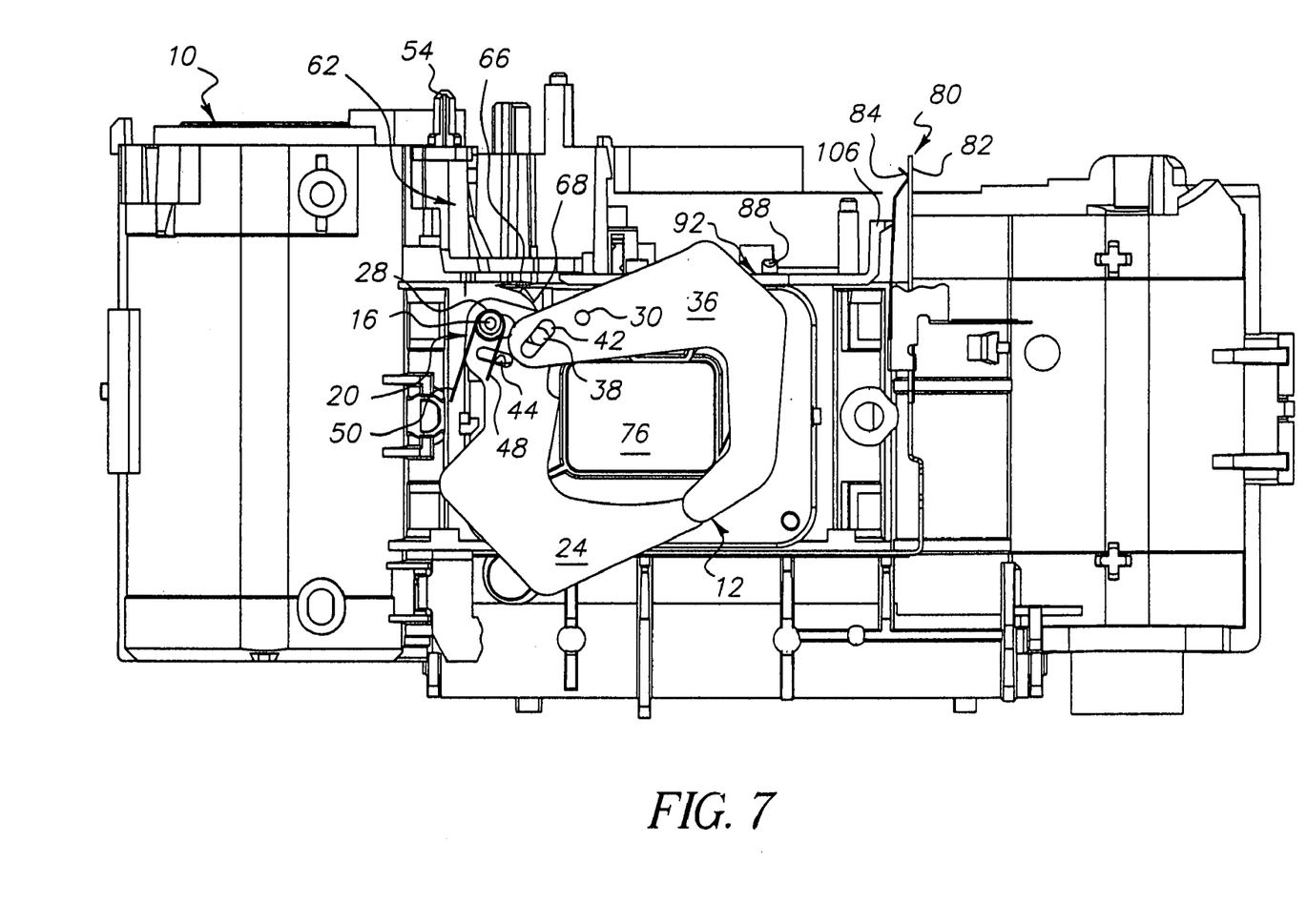

Once the high energy lever 62 has swung counterclockwise about 16° as in FIGS. 3, 6 and 7, via the resilient leg 64 of the high energy spring 58, the striker projection 66 on the underside of the high energy lever begins to move beyond (away from) the strike tab 68 on the curved edge portion 70 of the shutter driver 20. This allows the resilient leg 48 of the driver return spring 28 to urge the shutter driver 20 to rotate counterclockwise in FIG. 9 about the fixed post 16 on the main body part 10. As a result, the shutter drive post 38 on the shutter driver 20 that projects through the elongate slot 40 in the first shutter blade 24 and into the similar size slot 42 in the second shutter blade 36 pivots the first shutter blade counterclockwise in FIG. 9 about the fixed post 16 on the main body part 10 and pivots the second shutter blade clockwise in the same FIG. about the fixed post 30 on the main body part. This closing movement of the first and second shutter blades 24 and 36 causes the two blades to swing towards one another into an overlapping relation to re-cover the exposure aperture 76 in the main body part 12 in order to conclude exposure. When the first shutter blade 24 is pivoted counterclockwise to close, its edge notch 32 returns to contact with the fixed post 30 on the main body part 10.

Figure 10:
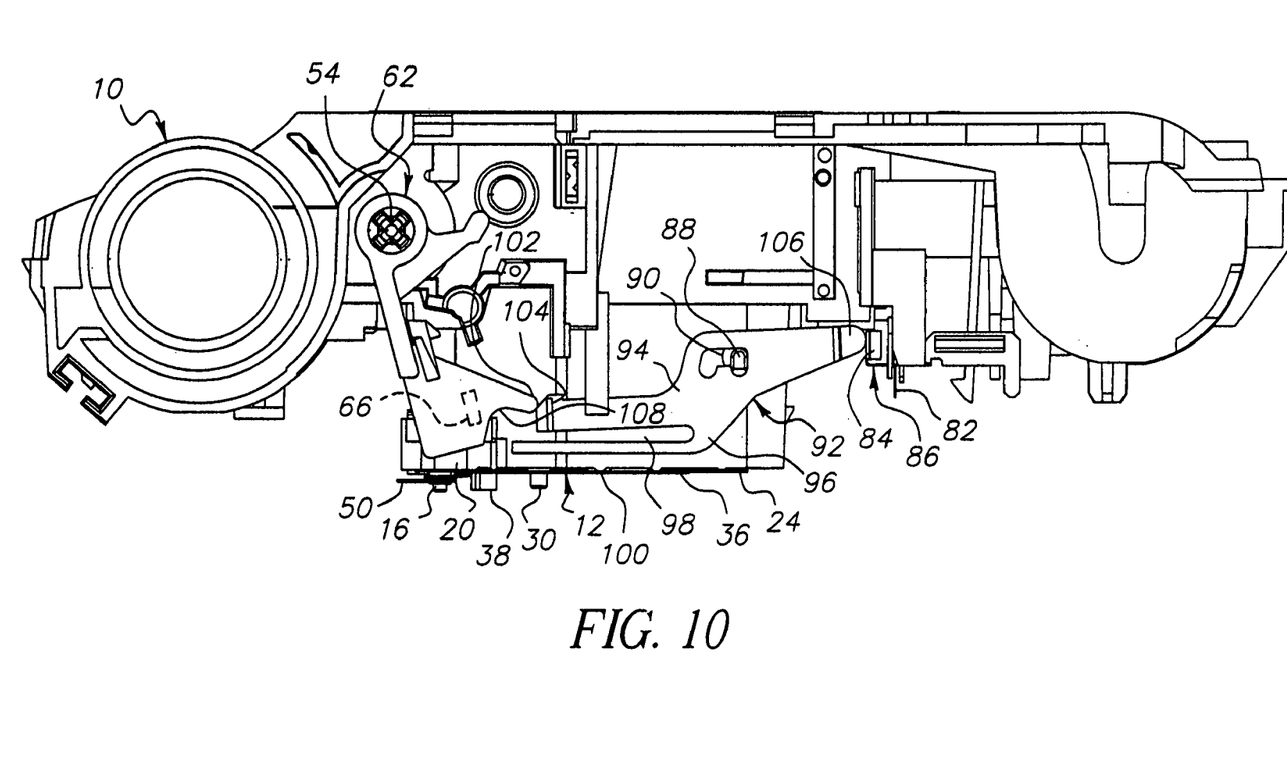
Figure 11:
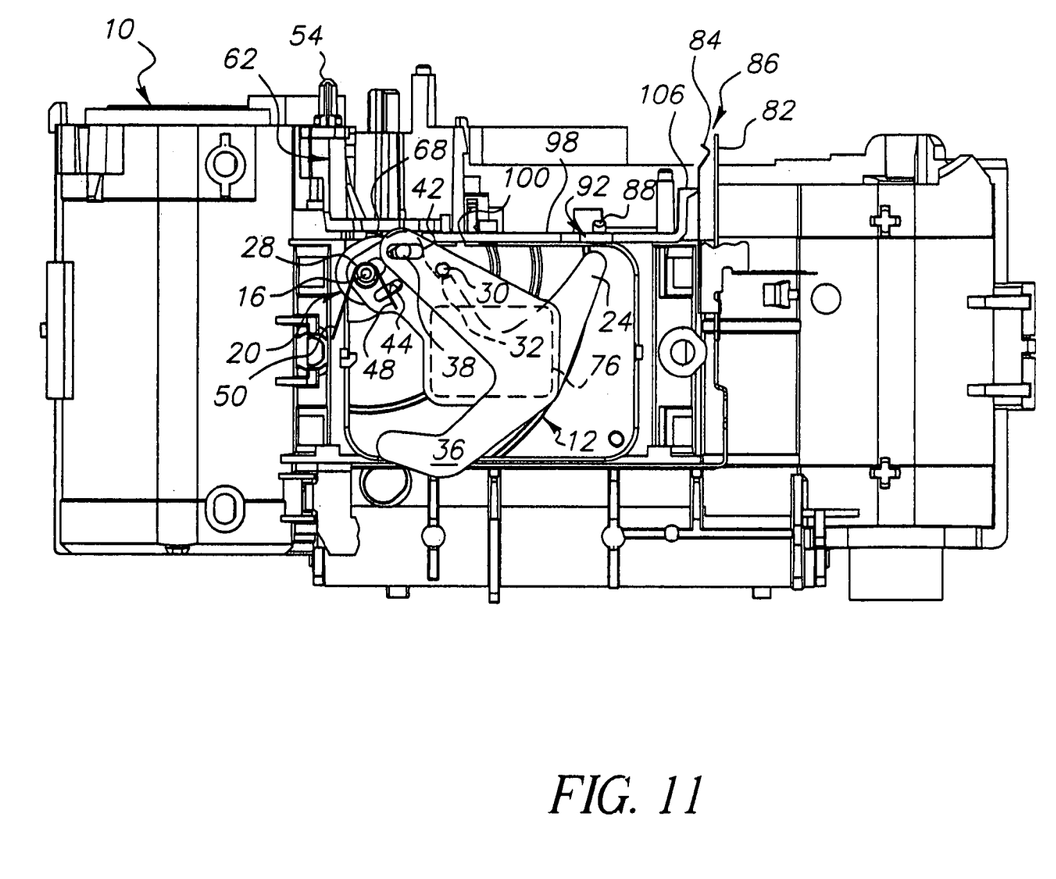
Figure 12:
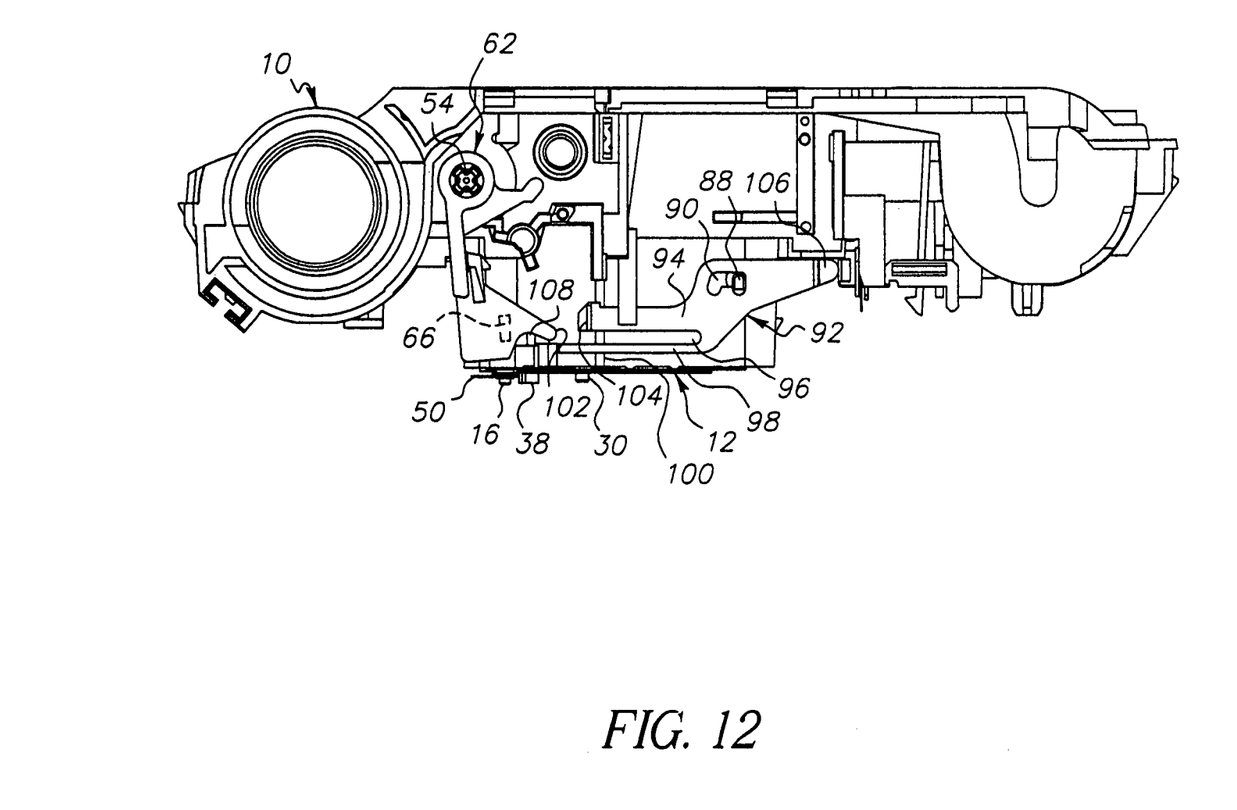
Figure 13:
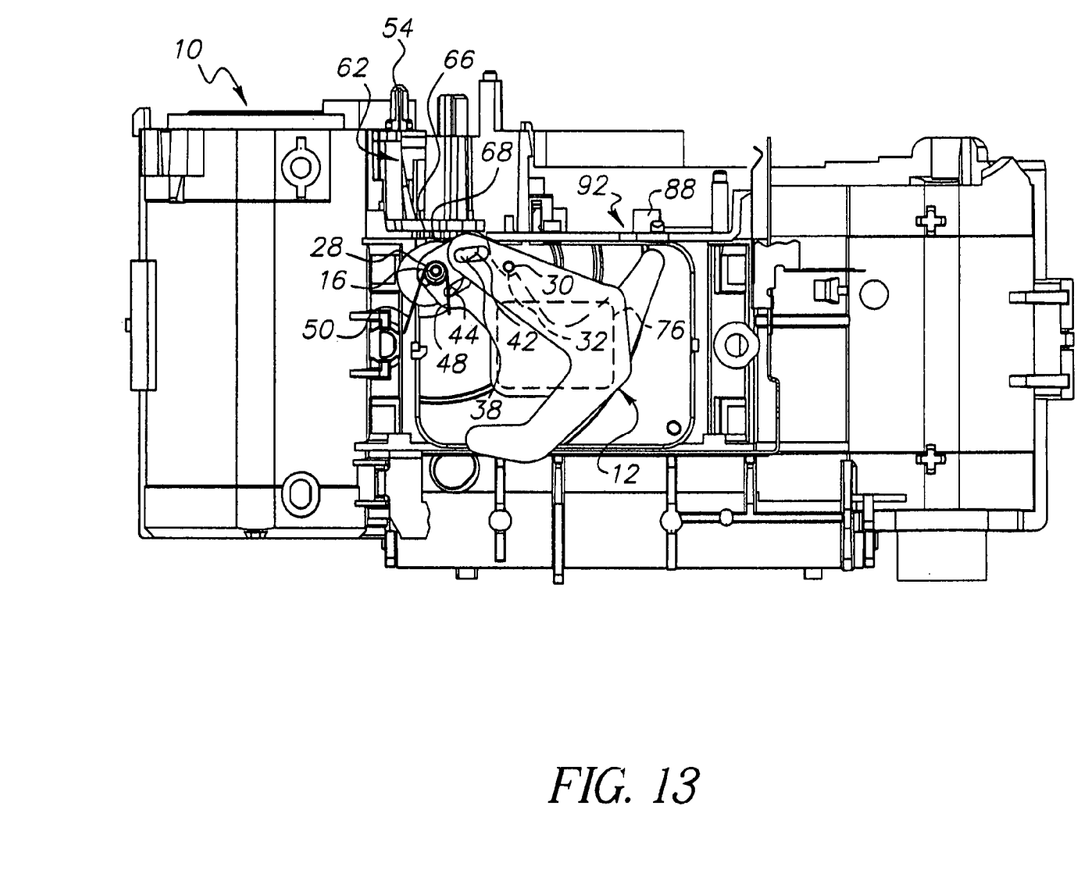

Once the high energy lever 62 has swung counterclockwise a total of about 27°, i.e. about 11° more than in FIG. 6, via the resilient leg 64 of the high energy spring 58, it is at the end of its travel counterclockwise. See FIG. 8. Then, as is known in the prior art, a metering cam (not shown) is rotated during manual film rewinding to return the high energy lever clockwise to its initial or home position to be re-latched (reset). When the high energy lever 62 is partway returned clockwise about 22° as in FIG. 10, the striker projection 66 on the underside of the high energy lever begins to move over the strike tab 68 on the curved edge portion 70 of the shutter driver 20 as in FIG. 11, causing the striker projection to begin to slightly depress the shutter driver downward to the left at an acute angle of about 30° in FIG. 11 and out of the way of the striker projection. Such depression of the shutter driver 20 is shown completed in FIGS. 12 and 13. Since the first shutter blade 24 is blocked at its edge notch 32 by the fixed post 30 on the main body part 10, the first shutter blade cannot pivot counterclockwise about the fixed post 16 on the main body part 10. Consequently, the shutter drive post 38 on the shutter driver 20 is constrained to translate in the elongate slot 40 in the first shutter blade 24. This causes the shutter driver 20 to be constrained to translate (rather than rotate) relative to the fixed post 16 in the elongate slot 18 in the shutter driver. Then, once the striker projection 66 on the underside of the high energy lever 62 moves past the strike tab 68 on the curved edge portion 70 of the shutter driver 20, the return spring 28 snaps the shutter driver backward. See FIGS. 2 and 5.

Preferably, the first and second shutter blades 24 and 36 are substantially reverse j-shaped and j-shaped as shown in FIGS. 1–7, to surround the exposure aperture 76 to uncover the exposure aperture when the two blades are open as in FIGS. 3 and 5 and cover the exposure aperture in partially overlapping relation when the two blades are closed as in FIGS. 2, 4, 6 and 7.

Shutter-Flash Synchronization

As shown in FIGS. 1–3, an electronic flash 78 including a flash circuit board 80 is mounted on the main body part 10. The flash circuit board 80 includes a fixed negative switch contact 82 and a leaf spring positive switch contact 84 that together form a normally open shutter-flash synchronization switch 86. The leaf spring positive switch contact 84 is biased to be spaced from the fixed negative switch contact 82 to maintain the shutter-flash synchronization switch 86 open as in FIGS. 2, 4 and 5, but it can be temporarily bent against the fixed negative switch contact as in FIGS. 3, 6 and 7 to close the shutter-flash synchronization switch 86 when the first and second shutter blades 24 and 36 are pivoted open. As is known in the prior art, the shutter-flash synchronization switch 86 is closed to fire the electronic flash 78 in order to provide flash illumination in synchronization with shutter opening.

As shown in FIGS. 1–13, a fixed translation/pivot-support post 88 on the main body part 10 projects upward into an elongate slot 90 in a translatable and pivotable switch closing slider or member 92. The switch closing slider 92 has a resilient pushed arm 94 and has a resilient guide arm 96 that longitudinally extends parallel to the pushed arm and is spaced from the pushed arm via an elongate gap 98. The guide arm 96 rests on a fixed guide post 100 on the main body part 10 to facilitate translation of the switch closing slider 92 as in FIGS. 6 and 8.

When the high energy lever 62 is unlatched in its initial or home position (by manual depression of the shutter release button), and is pivoted or swung counterclockwise about the fixed post 54 on the main body part 10 via the resilient leg 64 of the high energy spring 58, to pivot open the first and second shutter blades 24 and 36, a finger 102 of the high energy lever pushes against a free end 104 of the pushed arm 94 of the switch closing slider 92 to translate the slider along the fixed post 88, to the right in FIGS. 3, 6 and 7. Such translation is possible because the free end 104 of the pushed arm 94 is then in the way of the finger 102.

In FIGS. 3, 6 and 7, the switch closing slider 92 has been translated along the fixed post 88 sufficiently to the right for a switch closing end 106 of the slider to bend the leaf spring switch contact 84 against the fixed switch contact 82 to close the shutter-flash synchronization switch 86. Closure of the switch 86 synchronizes flash firing and shutter opening as is known in the prior art.

Figure 8:
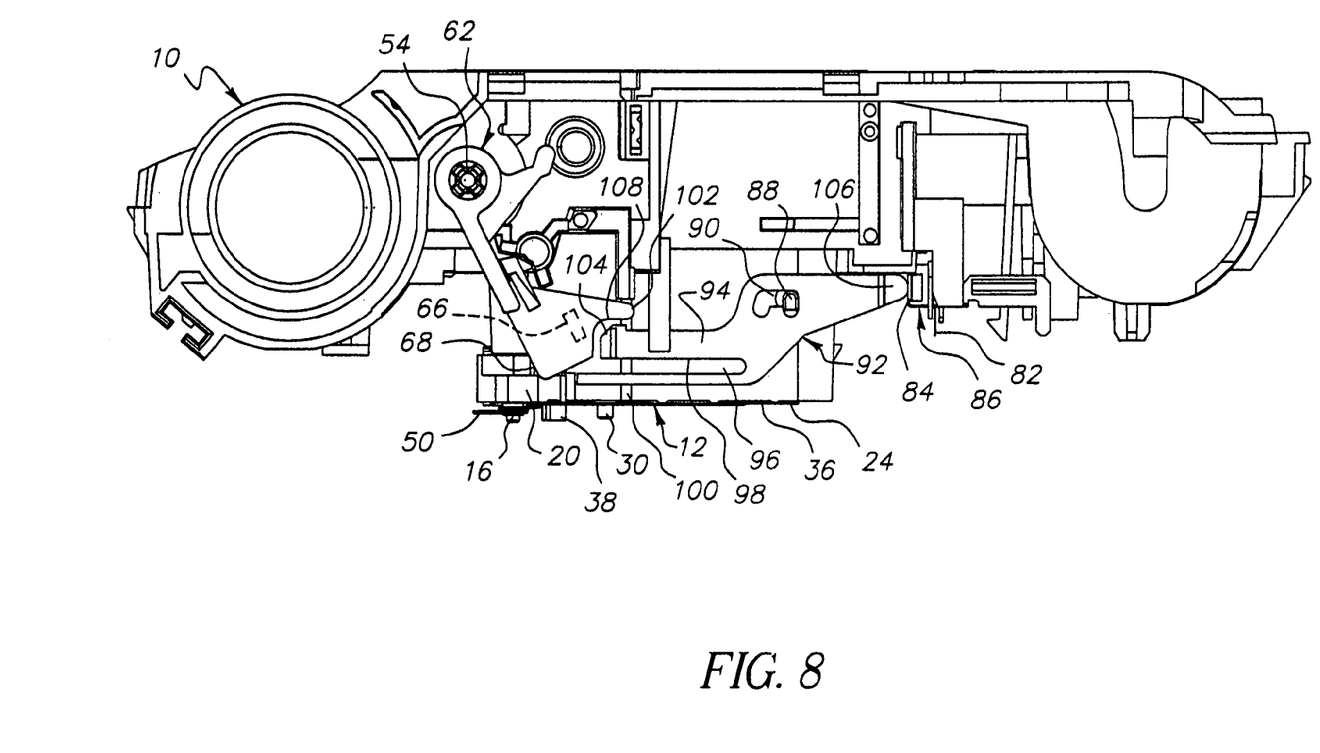
Figure 9:
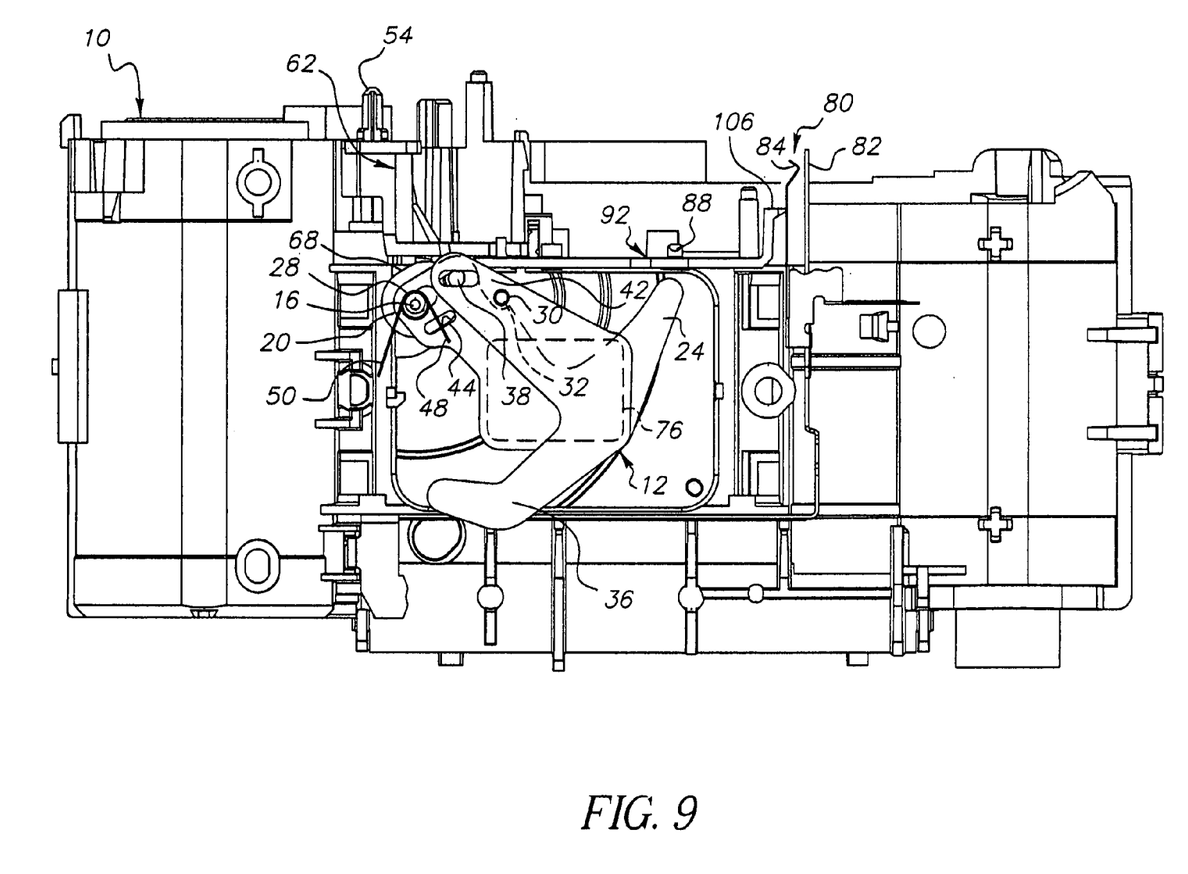

Then, in FIGS. 8 and 9, the high energy lever 62 is swung further counterclockwise via the resilient leg 64 of the high energy spring 58 to advance the finger 102 of the high energy lever beyond the free end 104 of the pushed arm 94 of the switch closing slider 92. This permits the bent leaf spring switch contact 84 to snap backward to reopen the shutter-flash synchronization switch 86. The leaf spring switch contact 84 when snapped backward pushes against the switch closing end 106 of the switch closing slider 92 to translate the slider backwards along the fixed post 88, to the left in FIGS. 8 and 9. The switch closing slider 92 is translated backwards to move the free end 104 of the pushed arm 94 into a notch 108 in the high energy lever 62. See FIGS. 8 and 9, which show the high energy member 62 at the end of its travel counterclockwise.

When the metering cam is rotated during manual film rewinding to return the high energy lever 62 clockwise to its initial or home position to be re-latched (reset), the free end 104 of the pushed arm 94 of the switch closing slider 92 initially is in the way of the finger 102 of the high energy lever as in FIG. 8. The finger 102 of the high energy lever 62 is moved against the free end 104 of the pushed arm 94 of the switch closing slider 92 to elastically deform or bend the pushed arm towards the guide arm 96 of the slider that rests on the fixed guide post 100 on the main body part 10. See FIGS. 10 and 11. That is, the pushed arm 94 is elastically deformed or bent into the elongate gap 98 between the pushed arm and the guide arm 96. This causes the switch closing slider 92 to swing or pivot counter clockwise in FIG. 10 about the fixed post 88 on the main body part 10. The switch closing slider 92 is pivoted counterclockwise only about 3° before the finger 102 of the high energy lever 62 moves past the free end 104 of the pushed arm 94. Once the finger 102 of the high energy lever 62 moves past the free end 104 of the pushed arm 94, the pushed arm snaps backwards from the gap 98, causing the switch closing slider 92 to reverse-pivot clockwise about 3° in FIGS. 12 and 13. That is, the switch closing slider 92 elastically recovers its original shape.

When the high energy lever 62 is retuned to its initial or home position in FIGS. 4 and 5, the free end 104 of the pushed arm 94 of the switch closing slider 92 is in the way of the finger 102 of the high energy lever to permit the sequence to be repeated.

The invention has been described in detail with particular reference to certain preferred embodiments thereof, but it will be understood that variations and modifications can be effected within the spirit and scope of the invention.

The invention claimed is:

1. A camera comprising an exposure aperture, a shutter that is movable open and closed to uncover and re-cover said exposure aperture, an electronic flash that is fired to provide flash illumination, a normally open shutter-flash synchronization switch that is closed to synchronize shutter movement and flash firing, a high energy member that is movable for moving said shutter and for closing said shutter-flash synchronization switch and that is returned to be reset, and a switch closing member that is normally in the way of said high energy member to be moved by said high energy member to close said shutter-flash synchronization switch and that is returned to be in the way of said high energy member when said shutter-flash synchronization switch reopens, but that is adapted to permit said high energy member to temporarily urge said switch closing member out of the way of said high energy member without re-closing said shutter-flash synchronization switch in order to allow said high energy member to return past said switch closing member to be reset, is characterized in that:

said switch closing member is resilient to make said switch closing member capable of being elastically deformed to enable said switch closing member to be temporarily urged out of the way of said high energy member and to make said switch closing member elastically recover its original shape once said high energy member is returned past said switch closing member to enable said switch closing member to return to being in the way of said high energy member.

2. A camera as recited in claim 1 wherein said switch closing member when elastically deformed bends to be temporarily shifted out of the way of said high energy member.

3. A camera as recited in claim 2 wherein a fixed post projects into an elongate slot in said switch closing member to support said switch closing member to swing about said fixed post when bending to be temporarily shifted out of the way of said high energy member.

4. A camera as recited in claim 1 wherein said shutter closing member is supported to be translated by said high energy member to move to close said shutter-flash synchronization switch.

5. A camera as recited in claim 4 wherein a fixed post projects into an elongate slot in said switch closing member to support said switch closing member to be translated along said fixed post.

6. A camera as recited in claim 1 wherein a fixed post projects into an elongate slot in said switch closing member to support said switch closing member to be translated relative to said fixed post to move to close said shutter-flash synchronization switch and to be swing relative to said fixed post when temporarily urged out of the way of said high energy member.

7. A camera as recited in claim 1 wherein said high energy member and said shutter closing member are relatively configured to cause said high energy member to move said shutter open simultaneously with said high energy member moving said switch closing member to close said shutter-flash synchronization switch.

8. A camera as recited in claim 1 wherein said shutter-flash synchronization switch is spring-biased open to return said switch closing member to be in the way of said high energy member when said shutter-flash synchronization switch reopens.

9. A camera comprising an exposure aperture, a shutter that is movable open and closed to uncover and re-cover said exposure aperture, an electronic flash that is fired to provide flash illumination, a normally open shutter-flash synchronization switch that is closed to synchronize shutter movement and flash firing, a high energy member that is movable for moving said shutter and for closing said shutter-flash synchronization switch and that is returned to be reset, and a switch closing member that is normally in the way of said high energy member to be moved by said high energy member to close said shutter-flash synchronization switch and that is returned to be in the way of said high energy member when said shutter-flash synchronization switch reopens, but that is adapted to permit said high energy member to temporarily urge said switch closing member out of the way of said high energy member without re-closing said shutter-flash synchronization switch in order to allow said high energy member to return past said switch closing member to be reset, is characterized in that:

said switch closing member is supported to be translated to move to close said shutter-flash synchronization switch and to return to be in the way of said high energy member and is supported to swing when temporarily urged out of the way of said high energy member.

10. A camera as recited in claim 9 wherein a fixed post projects into an elongate slot in said switch closing member to support said switch closing member to be translated along said fixed post and to be swung about said fixed post.

11. A camera as recited in claim 10 wherein said switch closing member has a pushed arm that is pushed by said high energy member to translate said switch closing member along said fixed post to be moved to close said shutter-flash synchronization switch and that is pushed by said high energy member to swing said switch closing member about said fixed post when temporarily urged out of the way of said high energy member.

12. A camera as recited in claim 11 wherein said switch closing member has a guide arm that longitudinally extends parallel to said pushed arm to facilitate said switch closing member being translated along said fixed post.

13. A camera as recited in claim 12 wherein a gap between said pushed arm and said guide arm permits said high energy member to bend said pushed arm towards said guide arm to cause said switch closing member to swing about said fixed post to be temporarily urged out of the way of said high energy member.

14. A camera as recited in claim 9 wherein said shutter-flash synchronization switch is spring-biased open to translate said switch closing member to return to be in the way of said high energy member when said shutter-flash synchronization switch reopens.

15. A camera comprising an exposure aperture, a shutter that is movable open and closed to uncover and re-cover said exposure aperture, an electronic flash that is fired to provide flash illumination, a normally open shutter-flash synchronization switch that is closed to synchronize shutter movement and flash firing, a high energy member that is movable for moving said shutter and for closing said shutter-flash synchronization switch and that is returned to be reset, and a switch closing member that is normally in the way of said high energy member to be moved by said high energy member to close said shutter-flash synchronization switch and that is returned to be in the way of said high energy member when said shutter-flash synchronization switch reopens, but that is adapted to permit said high energy member to temporarily urge said switch closing member out of the way of said high energy member without re-closing said shutter-flash synchronization switch in order to allow said high energy member to return past said switch closing member to be reset, is characterized in that:

said shutter-flash synchronization switch is spring-biased open to return said switch closing member to be in the way of said high energy member when said shutter-flash synchronization switch reopens.

16. A shutter-flash synchronizing method comprising:
pivoting a high energy lever against a switch closing member to cause the switch closing member to translate to close a shutter-flash synchronization switch in order to synchronize shutter movement and flash firing; and reverse-pivoting the high energy lever against the switch closing member to swing the switch closing member out of the way of the high energy member to allow the high energy member to return past the switch closing member to be reset without the switch closing member re-closing the shutter-flash synchronization switch.

17. A shutter-flash synchronization method as recited in claim 16 wherein the high energy lever is pivoted clear of the switch moving member once the shutter-flash synchronization switch is closed to allow the shutter-flash synchronization switch to reopen and reverse-translate the switch closing member to be in the way of the high energy lever before the high energy lever can be reverse pivoted.

18. A shutter-flash synchronizing method comprising:
pivoting a high energy lever against a switch closing member to cause the switch closing member to move to close a shutter-flash synchronization switch in order to synchronize shutter movement and flash firing;

reverse-pivoting the high energy lever against the switch closing member to elastically deform the switch closing member out of the way of the high energy member to allow the high energy member to return past the switch closing member to be reset without the switch closing member re-closing the shutter-flash synchronization switch; and allowing the switch closing member to elastically recover its original shape.

19. A camera as recited in claim 18 wherein the switch closing member when elastically deformed bends to be out of the way of the high energy member.

* * * * *